F. P. ANELLO & G. POCOROBA.
SIGNAL SYSTEM FOR VEHICLES AND THE LIKE.
APPLICATION FILED OCT. 20, 1916.
1,269,246.
Patented June 11, 1918.
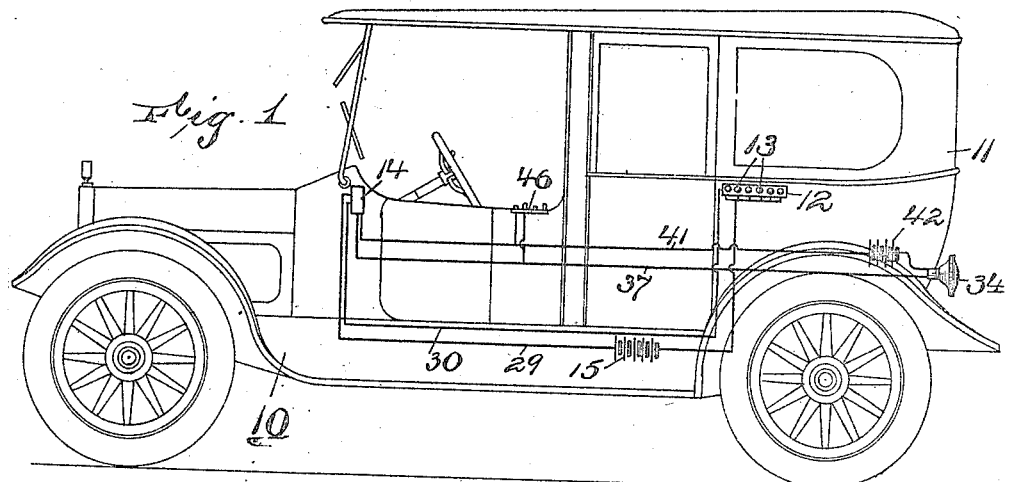
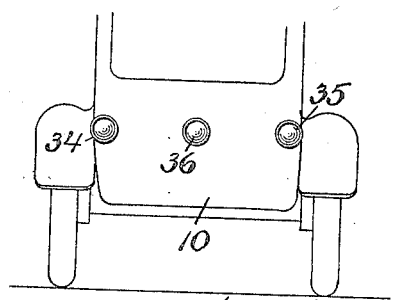
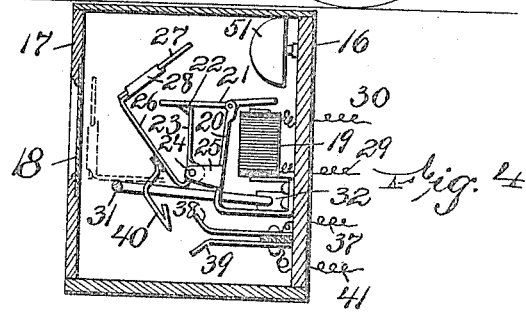
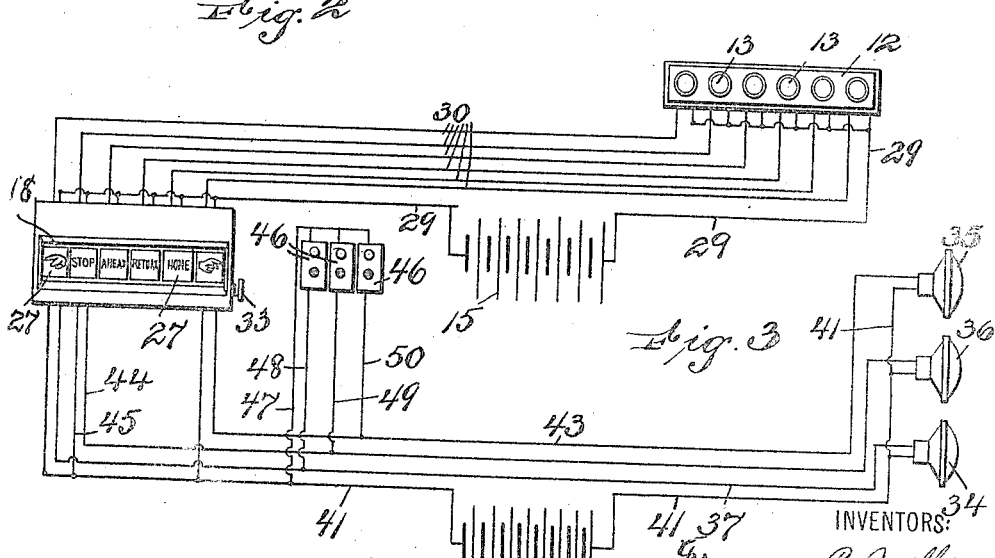
INVENTORS:
Francesco P. Anello,
Giuseppe Pocoroba,
BY Dyke & Caufield
ATTORNEYS.

UNITED STATES PATENT OFFICE.

FRANCESCO P. ANELLO AND GIUSEPPI POCOROBA, OF NEWARK, NEW JERSEY.

SIGNAL SYSTEM FOR VEHICLES AND THE LIKE.

1,269,246.

Specification of Letters Patent.   Patented June 11, 1918.

Application filed October 20, 1916.   Serial No. 126,645.

*To all whom it may concern:*

Be it known that we, FRANCESCO P. ANELLO and GIUSEPPI POCOROBA, subjects of the King of Italy, and residents of Newark, county of Essex, and State of New Jersey, have invented certain new and useful Improvements in Signal Systems for Vehicles and the like, of which the following is a specification.

This invention relates to an improved signaling device for automobiles which is particularly adapted for use in cars that are constructed so that the chauffeur or driver of the car is not easily communicated with by a person in the rear of the car, such as in limousines, the signal system permitting the person in the rear part of the car to communicate his desires, as to the course of the car, to the driver thereof. This system is further designed to provide an indicator or annunciator placed so as to be readily seen by the driver, and it is adapted to be actuated from the rear of the car, such annunciator having a series of indicating signs or legends to indicate a change in direction or other intention of the occupant of the car.

A further object of the invention is the provision of a signal system in which visual signals are placed on the rear of the car to be seen by the driver of a vehicle following, these rear signals being adapted to be operated by the driver or chauffeur and also being connected in a manner to permit the operation of such rear signals from the annunciator so that any change in direction of the car, or any stopping of the car, due to a signal from the occupant to the driver, will also show at the same time on the rear signals. It thus becomes unnecessary for the driver to manually operate the signals on the rear of the car when he has received, through the annunciator, directions to change the course of the car, while he can, on his own initiative, operate the rear signals in the absence of any direction or indication on the annunciator.

The invention is illustrated in the accompanying drawing, in which Figure 1 illustrates an automobile in unshaded outline, the position of the different elements of the signal system and their approximate relative positions are illustrated in heavier lines. Fig. 2 is a rear view of part of an automobile showing one disposition of the rear signal lights. Fig. 3 is a diagrammatic view showing how the different elements can be electrically connected, and Fig. 4 is a sectional view through the annunciator.

The system is illustrated on an automobile 10 which is of the limousine type, the rear inclosed tonneau portion 11 being provided with a suitable switchboard 12 having a set of buttons 13 thereon, these buttons 13 being adapted to operate different indicators in an annunciator 14, a suitable battery 15 being installed in the circuit to actuate the annunciator when any one of the buttons 13 is pressed.

Referring to Fig. 3 a more detailed view of this construction is shown, each of the buttons 13 being connected to the annunciator which on the inside is formed, so far as the indicating mechanism is concerned, in any of the usual manners, Fig. 4 showing one embodiment of an annunciator, the annunciator having a casing 16, the front 17 of which is provided with a transparent part 18, this being usually a sheet of glass. In the rear of the annunciator is a set of magnets, each magnet 19 being suitably supported in the casing adjacent to a bracket 20, to the top of which is pivoted a lever 21, one end of which is pulled down when the magnet is energized so as to release the tooth 22 from the end of the arm 23 which is pivoted, as at 24, between ears 25 of the bracket 20. The arm 23 of the frame 26 is normally held up by the tooth 22 of the lever 21, but when released it falls down to bring into view a card 27 held in the end 28 of the frame 26, such card, when it is dropped into place, showing through the front of the annunciator, a set of these cars being shown in Fig. 3. It will be evident that each card 27 shown in Fig. 3 is actuated by its magnet 19 and each magnet is connected electrically with a push-button 13. In the system illustrated each push-button is included in a controlling circuit comprising a single or common wire 29 which is connected up with the battery 15, and return wires 30 connecting each magnet with its respective push-button. The plates or cards 27 are provided with suitable legends or indicating devices, the one shown in Fig. 3 having hands, the one on the right pointing to the right and the one on the left pointing to the left which would indicate to the driver of the car that a change in the direction of the car was to be made. It will be understood that in this figure all the cards of the annunciator are in view to clearly illustrate what they might contain, but they would normally be out of sight raised above the transparent part of the front of the casing by reason of being held up in the position shown in Fig. 4. They are raised to this position and are also held in their lowered position by a bar 31 pivoted at its two ends in blocks 32 and projecting at one end and being provided with a handle 33. This replacing mechanism is common to annunciators.

Referring again to the annunciator in Fig. 3, it will be seen that other cards can have statements such as "stop," "ahead," "return," "home," or any other similar indicating statement that will convey quickly the intention to alter the course or direction of the car, or they might contain the ultimate destination of the car.

On the rear of the automobile are suitable visual signaling devices. the form shown comprising three lights, 34 which indicates a turn to the left, 35 which, when lighted, indicates a turn to the right, and 36 which, when lighted, indicates that the car is going to stop although the circuits can be otherwise arranged if desired. The light 34 is connected by a wire 37 with one arm 38 of a switch in the annunciator case, the other arm 39 of which switch is electrically connected with the arm 38 when the movable member 40 of the switch swings down between said arms 38 and 39, this swinging arm 40 swinging into such connecting position when the indicating card, indicating that the car is to go to the left, drops into position to be seen, and this completes the lamp circuit, the arm 39 being connected with the wire 41 which passes through the battery 42 and thus lights the light 34. The light 35 is similarly connected to the wire 41 and also to a wire 43 which is connected to a switch actuated by the card that indicates a turn to the right. The card that indicates the stopping of the automobile is connected by means of a wire 44 to the light 36 and is also connected by a wire 45 to the wire 41. It will thus be evident that these annunciator cards, when they drop into position to indicate to the chauffeur that he is to stop or to change the direction of the car, also actuate respective switches so as to automatically light the rear signal lights of the car to indicate to the driver of a car following, the contemplated change in the speed or direction of the car. A set of push-buttons 46 can also be arranged adjacent to the chauffeur so as to permit the closing of auxiliary circuits and the operation of these lights through these push-buttons, irrespective of the operation of the annunciator. A wire 47 connects these push-buttons with the wire 41 of the light circuit, and the wires 48, 49 and 50 are connected respectively with wires 37, 44 and 43 so that these lights can be lighted by manipulation of these buttons.

The invention avoids the use of cumbersome and space-consuming speaking tubes which are also in a sense unsanitary, and provides a silent means of communicating to the driver of the car, although if desirable a signal bell 51 can be used in the annunciator to call attention to the display of a card or indicating plate in the face of the annunciator. The invention also prevents the necessity of tapping on the glass which separates the persons in the rear of the car from the chauffeur. Both of the aforesaid methods of attracting the chauffeur's attention usually necessitate the turning of the chauffeur's head to listen to or see what is required of him, which, in crowded thoroughfares, or even under the best of conditions, is dangerous, whereas in the present device the annunciator can be placed where it requires no effort on the part of the chauffeur to see it, and his attention is drawn from the operation of the car but a very short time.

It will be understood that departures from and changes in the construction of the parts of this device may be resorted to within the scope of our claims and without departing from or sacrificing any of the advantages of our invention.

Having thus described our invention, we claim:

1. A signaling system for vehicles comprising an annunciator having a plurality of movable normally invisible visual signals, and means for moving the said signals into visible positions; a plurality of controlling circuits associated with said signals; a series of push buttons, each associated with and adapted to close one of said controlling circuits to thereby operate the visible signal controlled by the circuit with which the push button in question is associated; a plurality of lamp circuits in each of which a lamp is included; a plurality of circuit closing devices included one in each of said lamp circuits, said circuit closing devices being associated each with one of said visual signals and adapted to close the lamp circuit in which it is included when the visual signal associated with the circuit closing device in question is operated; a plurality of devices separate from said set of push buttons and each of which devices is adapted to close one of said lamp circuits; and means for supplying current to said several circuits.

2. A signaling system for vehicles comprising an annunciator having a plurality of movable normally invisible visual signals, and means for moving the said signals into visible positions; a plurality of controlling circuits associated with said signals; a series of push buttons, each associated with and adapted to close one of said controlling circuits to thereby operate the visible signal controlled by the circuit with which the push button in question is associated; a plurality of lamp circuits in each of which a lamp is included; a plurality of circuit closing devices included one in each of said lamp circuits, said circuit closing devices being associated each with one of said visual signals and adapted to close a lamp circuit in which it is included when the visual signal associated with the circuit closing device in question is operated; a plurality of auxiliary circuits associated with said lamp circuit; a second set of push buttons included one in each of said auxiliary circuits and adapted to close the same; and means for supplying current to said several circuits.

3. A signaling system for vehicles comprising an annunciator having a plurality of visual signals, and a plurality of magnets associated each with one of said signals and adapted to release the same and permit the signal controlled by it to move from its initial position; a plurality of controlling circuits associated with said magnets; a set of push buttons, each associated with and adapted to close one of said controlling circuits to thereby release the visual signal controlled by the circuit with which the push button in question is associated; a plurality of lamp circuits in each of which a lamp is included; a plurality of circuit closing devices included one in each of said lamp circuits, said circuit closing devices being associated each with one of said visual signals and adapted to close the lamp circuit in which it is included when the visual signal associated with the circuit closing device in question is released; a plurality of auxiliary circuits associated with said lamp circuit; a second set of push buttons included each in one of said auxiliary circuits and adapted to close the same; and means for supplying current to said several circuits.

In testimony that we claim the foregoing, we have hereto set our hands, this 18th day of October, 1916.

FRANCESCO P. ANELLO.
GIUSEPPI POCOROBA.